US012741536B2

(12) United States Patent
Koch

(10) Patent No.: US 12,741,536 B2
(45) Date of Patent: Sep. 22, 2026

(54) DISPLAY DEVICE, DASHBOARD AND TRANSPORTATION MEANS

(71) Applicant: Continental Automotive Technologies GmbH, Hannover (DE)

(72) Inventor: Marcus Koch, Waldbronn (DE)

(73) Assignee: Continental Automotive Technologies GmbH, Hannover (DE)

( * ) Notice: Subject to any disclaimer, the term of this patent is extended or adjusted under 35 U.S.C. 154(b) by 40 days.

(21) Appl. No.: 18/199,465

(22) Filed: May 19, 2023

(65) Prior Publication Data

US 2023/0373302 A1 Nov. 23, 2023

(30) Foreign Application Priority Data

May 20, 2022 (DE) ..................... 10 2022 205 051.7

(51) Int. Cl.

| | |
|---|---|
| ***B60K 35/00*** | (2024.01) |
| ***B60K 35/22*** | (2024.01) |
| ***B60K 35/60*** | (2024.01) |
| ***B60K 37/00*** | (2006.01) |

(52) U.S. Cl.

CPC .............. *B60K 35/60* (2024.01); *B60K 35/22* (2024.01); *B60K 37/00* (2013.01); *B60K 2360/652* (2024.01); *B60K 2360/691* (2024.01); *B60K 2360/816* (2024.01)

(58) Field of Classification Search

CPC ........ B60K 35/00; B60K 35/50; B60K 35/60; B60K 35/22; B60K 2360/652; B60K 2360/691; B60K 2360/816; B60K 2360/1523; B60K 37/00; B60R 21/055; B60R 21/00; B60R 21/045; B60R 2021/0048; B62D 25/14; B60Y 2306/01; B60Y 2400/92

See application file for complete search history.

(56) References Cited

U.S. PATENT DOCUMENTS

| | | |
|---|---|---|
| 4,112,718 A | 9/1978 | Logsdon et al. |
| 4,256,340 A | 3/1981 | Dunchock |
| 4,818,008 A | 4/1989 | Cressoni |

(Continued)

FOREIGN PATENT DOCUMENTS

| | | |
|---|---|---|
| CN | 103742840 A | 4/2014 |
| CN | 104797973 | 7/2015 |

(Continued)

OTHER PUBLICATIONS

Office Action dated Dec. 20, 2022 from corresponding German patent application No. 10 2022 205 051.7.

(Continued)

*Primary Examiner* — Christopher E Leiby
(74) *Attorney, Agent, or Firm* — COZEN O'CONNOR

(57) ABSTRACT

A display device and a dashboard having such a display device is disclosed. The disclosure moreover relates to a motor vehicle having such a dashboard. The display device has a display module having a display panel and a housing for receiving the display module. The housing on two opposite sides has resilient fastening elements. The latter are designed in such a manner that a force acting perpendicularly on the display panel causes a rotation of the display device about an axis perpendicular to the two opposite sides.

8 Claims, 4 Drawing Sheets

(56) References Cited

U.S. PATENT DOCUMENTS

| | | | | |
|---|---|---|---|---|
| 5,443,285 | A | 8/1995 | Boll | |
| 5,905,477 | A | 5/1999 | Kuwayama et al. | |
| 6,149,196 | A | 11/2000 | Guiard et al. | |
| 6,175,170 | B1 | 1/2001 | Kota et al. | |
| 7,692,127 | B1 | 4/2010 | Linn et al. | |
| 8,727,413 | B2 | 5/2014 | Seiller et al. | |
| 9,834,254 | B2 | 12/2017 | Staines | |
| 9,878,674 | B2 | 1/2018 | Dunham et al. | |
| 9,979,923 | B1 * | 5/2018 | Nemeth | B60R 11/0235 |
| 10,065,572 | B2 | 9/2018 | Kuntze et al. | |
| 10,537,033 | B2 | 1/2020 | Delmaere et al. | |
| 10,556,556 | B2 | 2/2020 | Alexander et al. | |
| 10,675,975 | B2 | 6/2020 | Krier | |
| 11,363,745 | B1 * | 6/2022 | Duncan | B60K 35/22 |
| 2001/0048265 | A1 | 12/2001 | Miller et al. | |
| 2005/0138852 | A1 | 6/2005 | Yamauchi | |
| 2006/0203480 | A1 | 9/2006 | Choi | |
| 2008/0030648 | A1 | 2/2008 | Morita et al. | |
| 2008/0043463 | A1 | 2/2008 | Park et al. | |
| 2008/0068860 | A1 | 3/2008 | Peng et al. | |
| 2010/0001150 | A1 | 1/2010 | Chiu | |
| 2010/0090498 | A1 | 4/2010 | Jungert et al. | |
| 2010/0141867 | A1 | 6/2010 | Ogihara et al. | |
| 2011/0141702 | A1 | 6/2011 | Kiesel et al. | |
| 2011/0216527 | A1 | 9/2011 | Fan et al. | |
| 2011/0304798 | A1 | 12/2011 | Tanaka et al. | |
| 2012/0063081 | A1 | 3/2012 | Grunwald | |
| 2013/0128128 | A1 | 5/2013 | Ikuta | |
| 2013/0195711 | A1 * | 8/2013 | Araoka | C22C 23/06 420/402 |
| 2014/0301025 | A1 | 10/2014 | Liu | |
| 2014/0306576 | A1 | 10/2014 | Ervin et al. | |
| 2016/0009178 | A1 | 1/2016 | Busse et al. | |
| 2016/0046243 | A1 | 2/2016 | Rode et al. | |
| 2016/0345045 | A1 * | 11/2016 | Liu | G06F 1/1633 |
| 2016/0362072 | A1 | 12/2016 | Xu et al. | |
| 2017/0212555 | A1 | 7/2017 | Fafard | |
| 2017/0249011 | A1 | 8/2017 | Belley et al. | |
| 2018/0293964 | A1 | 10/2018 | Kuehn et al. | |
| 2019/0265551 | A1 | 8/2019 | Liu et al. | |
| 2020/0166803 | A1 | 5/2020 | Kyoukane et al. | |
| 2020/0287109 | A1 | 9/2020 | Chang et al. | |
| 2020/0292885 | A1 | 9/2020 | Liu et al. | |
| 2020/0326592 | A1 | 10/2020 | Lin et al. | |
| 2020/0384861 | A1 | 12/2020 | Kadam et al. | |
| 2021/0162931 | A1 * | 6/2021 | Bruegl | B60R 11/0235 |
| 2021/0317943 | A1 | 10/2021 | Kang et al. | |
| 2022/0136539 | A1 | 5/2022 | Longo et al. | |
| 2022/0227307 | A1 * | 7/2022 | Shout | B60R 11/0235 |
| 2022/0299823 | A1 | 9/2022 | Li et al. | |
| 2023/0166597 | A1 | 6/2023 | Guenther et al. | |
| 2023/0202300 | A1 | 6/2023 | Badar et al. | |
| 2024/0262199 | A1 | 8/2024 | Hokari et al. | |

FOREIGN PATENT DOCUMENTS

| | | | |
|---|---|---|---|
| CN | 204494220 | | 7/2015 |
| CN | 107031402 | | 8/2017 |
| CN | 209086612 | | 7/2019 |
| CN | 210437017 | | 5/2020 |
| CN | 112445026 | | 3/2021 |
| CN | 112764267 | | 5/2021 |
| CN | 215219371 | | 12/2021 |
| CN | 215340620 | | 12/2021 |
| CN | 114174905 | | 3/2022 |
| CN | 216128148 | | 3/2022 |
| DE | 4227528 | C1 | 12/1993 |
| DE | 4217177 | C2 | 5/1994 |
| DE | 102008023469 | A1 | 12/2009 |
| DE | 102008052007 | A1 | 4/2010 |
| DE | 102014001862 | B4 | 10/2015 |
| DE | 102014111676 | A1 | 2/2016 |
| DE | 102014221505 | A1 | 4/2016 |
| DE | 102016004156 | A1 | 9/2016 |
| DE | 102015010295 | A1 | 2/2017 |
| DE | 102016200902 | A1 | 7/2017 |
| DE | 202018002037 | | 5/2018 |
| DE | 102018110548 | A1 | 11/2019 |
| DE | 102018218328 | B3 | 3/2020 |
| DE | 102020112133 | A1 | 11/2021 |
| DE | 102020128465 | B3 | 3/2022 |
| DE | 102021103740 | A1 | 8/2022 |
| EP | 1687185 | B1 | 4/2008 |
| EP | 2156261 | A1 | 2/2010 |
| EP | 3006773 | A1 | 4/2016 |
| EP | 3045340 | A1 | 7/2016 |
| GB | 1148694 | A | 4/1969 |
| JP | S60219121 | | 11/1985 |
| JP | S6118517 | A | 1/1986 |
| JP | S61018517 | | 1/1986 |
| JP | 2006282100 | | 10/2006 |
| JP | 2010135204 | A | 6/2010 |
| JP | 2017037832 | A | 2/2017 |
| JP | 2020053405 | A | 4/2020 |
| KR | 101519349 | | 5/2015 |
| KR | 20150065318 | | 6/2015 |
| KR | 20170061535 | A | 6/2017 |
| KR | 20180062573 | A | 6/2018 |
| TW | 200842448 | A | 11/2008 |
| TW | 200931120 | A | 7/2009 |
| TW | 202109160 | A | 3/2021 |
| TW | 202142936 | A | 11/2021 |
| WO | 2008127731 | A1 | 10/2008 |
| WO | 2017097583 | A1 | 6/2017 |
| WO | 2020008237 | A1 | 1/2020 |
| WO | 2021242558 | A2 | 12/2021 |

OTHER PUBLICATIONS

Search Report dated Nov. 16, 2023 from related European patent application No. 23165875.8.

Search Report dated Nov. 14, 2023 from corresponding European patent application No. 23165869.1.

Office Action dated Dec. 16, 2022 from related German patent application No. 10 2022 205 052.5.

Office Action dated Dec. 14, 2022 from related German patent application No. 10 2022 205 083.5.

Search Report dated Oct. 20, 2023 from related European patent application No. 23170127.7.

Non-Final Office Action dated Sep. 6, 2023 from related U.S. Appl. No. 18/199,477.

Office Action dated Jan. 18, 2023 from related German patent application No. 10 2022 205 053.3.

Office Action dated Dec. 13, 2022 from related German patent application No. 10 2022 205 050.9.

Search Report dated Nov. 14, 2023 from related European patent application No. 23165862.6.

Office Action issued on Oct. 22, 2024 from related Korean patent application No. 10-2023-0051654.

Office Action issued on Oct. 18, 2024 from related Korean patent application No. 10-2023-0063424.

Office Action received Aug. 2, 2024 from related Taiwan patent application No. 112118715.

Notice to Submit Response of Korean Patent Application No. 10-2023-0051655, dated Jun. 17, 2025.

Notice of Decision of Rejection of Korean Patent Application No. 10-2023-0051656, dated Jun. 17, 2025.

Office Action dated Jan. 13, 2026 for corresponding U.S. Appl. No. 18/199,472.

Office Action dated Jan. 13, 2026 for corresponding Chinese Application No. 202310440351.3.

Final Office Action of related U.S. Appl. No. 18/199,472 dated Jan. 13, 2026.

Final Office Action of related U.S. Appl. No. 18/199,454 dated Jan. 16, 2026.

Office Action dated Dec. 19, 2025 for corresponding U.S. Appl. No. 18/199,484, filed May 19, 2023.

Notice of Decision for Rejection dated Feb. 10, 2026 for corresponding Korean application No. 1020230051655.

(56) References Cited

OTHER PUBLICATIONS

Office Action dated Jan. 16, 2026 for corresponding U.S. Appl. No. 18/199,454.

* cited by examiner

DISPLAY DEVICE, DASHBOARD AND TRANSPORTATION MEANS

CROSS REFERENCE TO RELATED APPLICATION

This U.S. patent application claims the benefit of German patent application No. 10 2022 205 051.7, filed May 20, 2022, which is hereby incorporated by reference.

TECHNICAL FIELD

The present disclosure relates to a display device and to a dashboard having such a display device. The disclosure moreover relates to a transportation means having such a dashboard.

BACKGROUND

Display devices in the vehicle interior are located directly in front of the vehicle occupants and are, therefore, always exposed to the risk of a head impact. Therefore, a new product has to pass a certified head impact test in order to be permitted for use.

By virtue of the glass surface in display devices there is an increased risk that the latter do not pass such a test when the energy of the impact is not absorbed by ductile elements behind the glass, while the glass per se is sufficiently protected so as not to break. The glass edge is particularly at risk here because a breakage becomes more probable the closer to the glass edge the impact takes place.

Current solutions are therefore based on a very robust and stiff support for the glass, in combination with a very ductile element behind the display device, which absorbs the energy of the head impact. In many cases the glass requires an additional protective film in order to withstand the impact. However, such a film compromises the optical performance of the display device and leads to additional costs for the display device and the production process.

There is also a similar set of issues in other components for the interior of a transportation means, which may pose a hazard for the occupant in the event of an impact of the respective occupant.

In this context, EP 1 687 185 B1 describes a dashboard for a motor vehicle, which has an upper part and a lower part that is connected to the upper part with the aid of connection means. The lower part is formed by a storage tray which extends relative to the lower limbs of a passenger. In the event of a passenger impacting the lower part with a predefined force, the connection means may be uncoupled so that the lower part may move relative to the upper part, toward the front end of the motor vehicle.

It is an object of the disclosure to provide improved protection for occupants of a transportation means.

SUMMARY

According to a first aspect of the disclosure, a display device has a display module having a display panel, and a housing for receiving the display module, wherein the housing on two opposite sides has resilient fastening elements which are designed in such a manner that a force acting perpendicularly on the display panel causes a rotation of the display device about an axis perpendicular to the two opposite sides.

In the solution according to the disclosure, a rotation of the display device and in this way simultaneously a movement of the impact point away from the head of the occupant is caused by the force which is exerted on the display panel in the event of a head impact. At the same time, the impact point in the plane of the display panel is displaced farther into the interior region of the display panel. This has the advantage that the risk of breakage of the display panel, or of a cover glass of the display panel, is reduced such that the creation of hazardous glass splinters is avoided. The resilient fastening elements here are preferably designed in such a manner that a relatively small force, which does not yet pose a risk to the glass, is sufficient for triggering the rotation. The required force should simultaneously be sufficiently high to avoid any inadvertent triggering of the rotation as a result of an operating error.

According to one aspect of the disclosure, the two opposite sides have in each case two or more resilient fastening elements. By using two or more resilient fastening elements per side, a relatively large rotation angle may be achieved in association with a comparatively small deflection or deformation of the resilient fastening elements.

According to one aspect of the disclosure, the resilient fastening elements are an integral constituent part of the housing. No additional parts, and thus also no additional tools or production steps, are required. This leads to a more robust tolerance chain for the display device and potential gaps to adjacent components. Simultaneously, no dissimilar materials are combined, this reducing the potentially disruptive effects of temperature variations, e.g. deformations or the Mura effect resulting therefrom. Risks associated with corrosion are also reduced. The resilient fastening elements may be generated in the context of the production, e.g. by using a suitable mold or by subsequent stamping.

According to one aspect of the disclosure, the housing and the resilient fastening elements are made from a magnesium-based material. Magnesium is a material frequently used in the automotive sector, which is used in particular for housings of display devices. However, other materials may also be used, of course.

According to one aspect of the disclosure, the resilient fastening elements are bistable elements. The use of bistable elements has the advantage that the display device is located in a defined position upon rotation. By means of this position it may be immediately ascertained by the occupant or else a workshop that an impact has taken place on the display device and the latter has to be repaired or replaced.

According to one aspect of the disclosure, the bistable elements implement a flexural buckling mechanism. In such a flexural buckling mechanism an arm of a bistable element snaps or jumps from a stable first state to a stable second state when a sufficient force is exerted. This rapid jumping action leads to a high acceleration of the housing in relation to the fastening points. In this case, the head impact is only the trigger for the rotation, while the flexural buckling mechanism subsequently accelerates the latter. This reduces the energy which has to be absorbed by the display panel or the cover glass by virtue of the impact.

According to one aspect of the disclosure, an arm length of the bistable elements is chosen such that the resultant elastic deformation path enables a jump from a first state to a second state. Magnesium is a rather brittle material of only minor elasticity. If the housing and the bistable elements are made from a magnesium-based material or any other brittle material, large lever arms are required in order to achieve the elastic deformation path required for the jumping action.

According to one aspect of the disclosure, the bistable elements when jumping from the first state to the second state are stressed beyond the yield point. This ensures that the bistable elements after the jumping action are no longer functional for this movement and therefore cannot be used a second time. Even if it were possible to permit the bistable elements to snap back into place, the strain hardening of the bistable elements would be problematic. However, this is a state which is entirely of minor importance in terms of an accident or head impact that has happened. Rather, it is indeed safety relevant that the triggering of the mechanism is clearly identifiable and the latter may clearly no longer be used. It is mandatory that a mechanism once triggered must be replaced because the correct functioning would no longer be reliably guaranteed in the event of a second triggering.

A display device according to the disclosure is preferably used in a dashboard for a transportation means. The display device here may be fastened to the assigned fastening points of the dashboard by means of the resilient fastening elements. Such a dashboard offers the occupants of the transportation means an improved impact protection.

A dashboard according to the disclosure is preferably used in a transportation means. A transportation means may be, for example, a motor vehicle but alternatively also an aircraft, a rail vehicle, or a watercraft.

Further features of the present disclosure will be evident from the following description and the appended claims in conjunction with the figures.

DETAILED DESCRIPTION

For a better understanding of the principles of the present disclosure, embodiments of the disclosure will be explained in more detail below by means of the figures. The same reference signs are used in the figures for identical or functionally identical elements and are not necessarily described again for each figure. It is understood that the invention is not limited to the illustrated embodiments and that the described features may also be combined or modified without departing from the scope of protection of the disclosure as defined in the appended claims.

Figure 1:
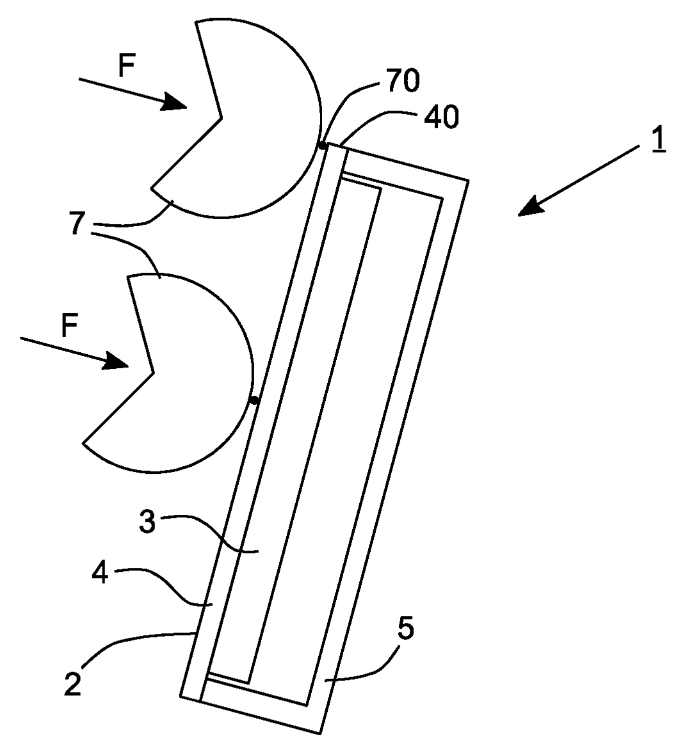
FIG. 1 schematically shows a head impact on a display device in a transportation means.

FIG. 1 schematically shows a head impact on a display device 1 in a transportation means. A lateral view is illustrated. The display device 1 has a display module 2, having a display panel 3 and a cover glass 4 which are disposed in a housing 5. Display devices 1 in the vehicle interior are located directly in front of the vehicle occupants and are, therefore, always exposed to the risk of a head impact. If the impact point 70 of the head 7 tends to be in the interior region of the display panel 3, or of the cover glass 4, a breakage of the glass is relatively improbable. However, a breakage becomes more probable the closer the impact point 70 is to the glass edge 40. Therefore, the glass edge 40 is in particular at risk.

Figure 2:
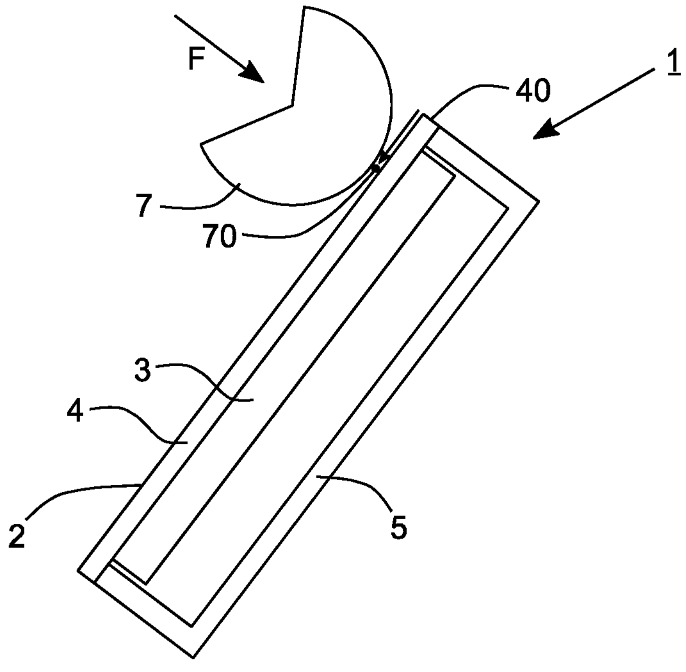
FIG. 2 schematically shows a displacement of an impact point as a result of a rotation of the display device.

FIG. 2 schematically shows a displacement of an impact point 70 as a result of a rotation of the display device 1. The risk of a breakage of the display panel 3, or of the cover glass 4 of the display panel 3, may be reduced when the impact point 70 is displaced away from the glass edge 40, farther into the interior region of the display panel 3, or of the cover glass 4. This may be achieved by virtue of the anatomy of the user's body in that a rotation of the display device 1 about a horizontal axis, which is substantially parallel to the display panel 3, takes place during the impact of the head 7 on the display panel 3. A mechanism in which a relatively small force F, which does not yet pose a risk to the glass, is sufficient for triggering the rotation, is desirable for this rotation. Simultaneously, the required force F should be sufficiently high to avoid any inadvertent triggering of the rotation as a result of an operating error.

Figure 3:
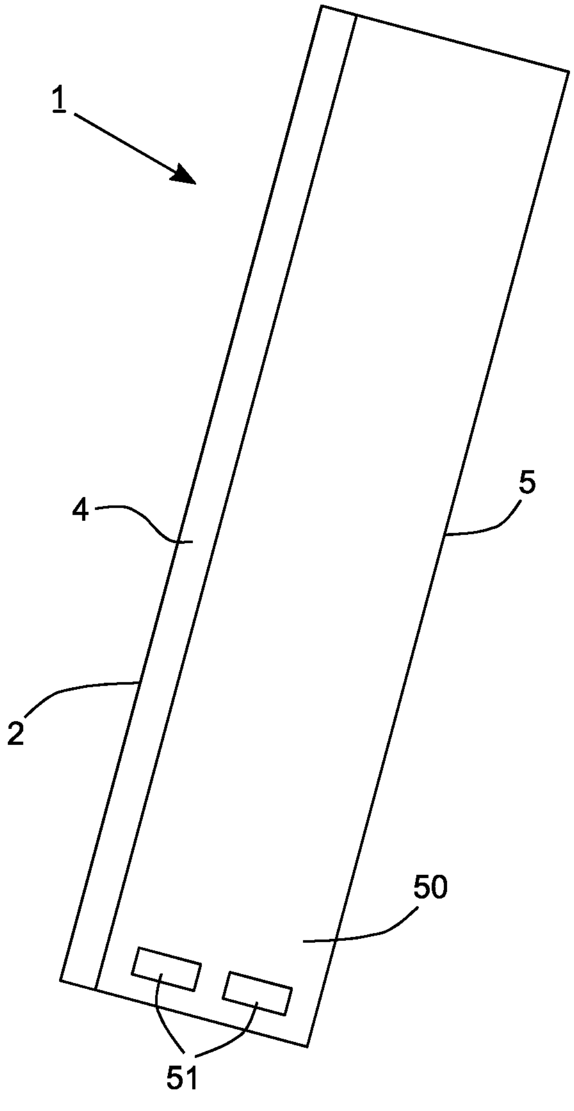
FIG. 3 schematically shows a display device according to the disclosure.

FIG. 3 schematically shows a display device 1 according to the disclosure. The housing 5 on two opposite sides 50 has resilient fastening elements 51. These are only schematically illustrated in FIG. 3. A specific implementation of the resilient fastening elements 51 will be explained hereunder by means of FIG. 4 and FIG. 5. The resilient fastening elements 51 are designed in such a manner that a force F acting perpendicularly on the display panel, or the cover glass 4, causes a rotation of the display device 1 about an axis perpendicular to the two opposite sides 50. The two opposite sides 50 preferably have in each case two or more resilient fastening elements 51. By using two or more resilient fastening elements 51 per side 50, a relatively large rotation angle may be achieved in association with a small deflection or deformation of the resilient fastening elements 51. However, it is likewise possible for only one resilient fastening element 51 to be provided per side 50, e.g. in combination with an additional pivot point.

Figure 4:
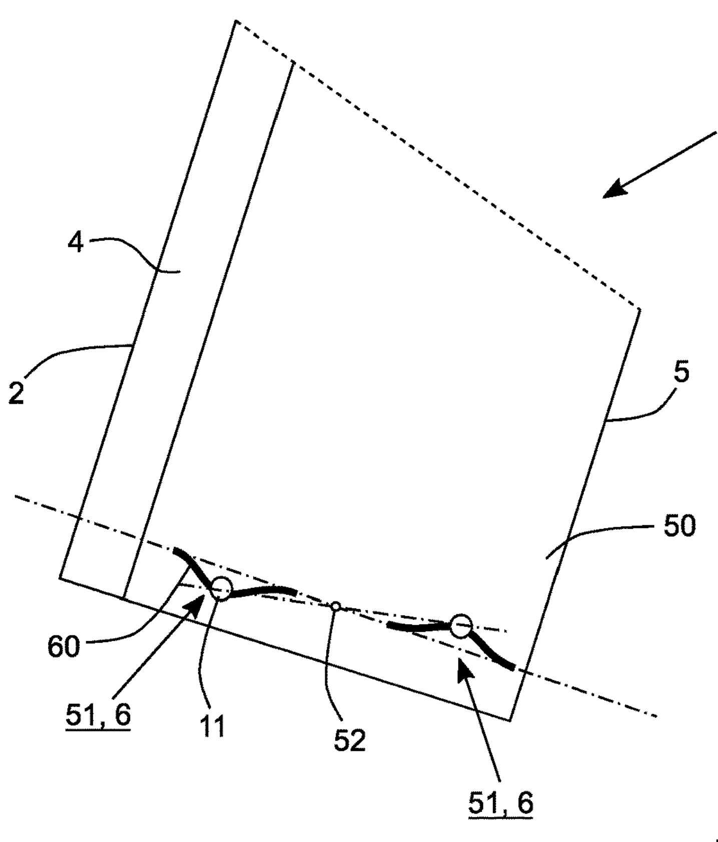
FIG. 4 schematically shows a display device according to the disclosure, having two bistable elements in a first state.
Figure 5:
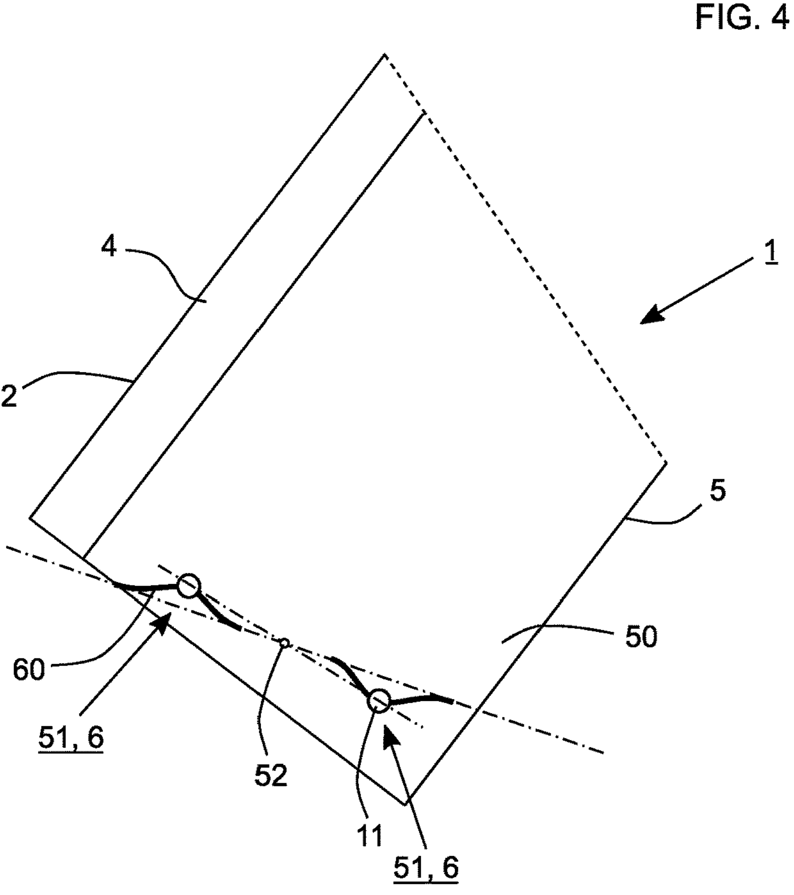
FIG. 5 schematically shows the display device from FIG. 4 after the bistable elements have jumped to a second state.

FIG. 4 schematically shows a display device 1 according to the disclosure, having two bistable elements 6 in a first state. Each of the bistable elements 6 forms one resilient fastening element 51 and implements a flexural buckling mechanism. In such a flexural buckling mechanism an arm 60 of a bistable element 6 snaps or jumps from a stable first state to a stable second state when a sufficient force is exerted. FIG. 5 schematically shows the display device 1 after the bistable elements 6 have jumped in such a way to the second state. This rapid jumping action leads to a high acceleration of the housing 5 in relation to the fastening points 11 in the dashboard. In this case, the head impact is only the trigger for the rotation about a horizontal axis 52, while the flexural buckling mechanism subsequently accelerates said rotation. This reduces the energy which has to be absorbed by the display panel, or the cover glass 4, by virtue of the impact. An arm length of the bistable elements 6 is preferably chosen such that the resultant elastic deformation path enables a jump from a first state to a second state. For reasons of saving weight, housings 5 of display devices 1 are often made from magnesium-based materials in the automotive sector. However, magnesium is a rather brittle material of only minor elasticity. Therefore, large lever arms are required for achieving the elastic deformation path required for the jumping action.

The bistable elements 6 when jumping from the first state to the second state are preferably stressed beyond the yield point. This ensures that the bistable elements 6 after the jumping action are no longer functional for this movement and therefore cannot be used a second time. Even if it were possible to permit the bistable elements 6 to snap back into place, the strain hardening of the bistable elements 6 would be problematic. However, this is a state which is entirely of minor importance in terms of an accident or head impact that has happened. Rather, it is indeed safety relevant that the triggering of the mechanism is clearly identifiable and the latter may no longer be used. It is mandatory that a mechanism once triggered must be replaced because the correct functioning would no longer be reliably guaranteed in the event of a second triggering.

Figure 6:
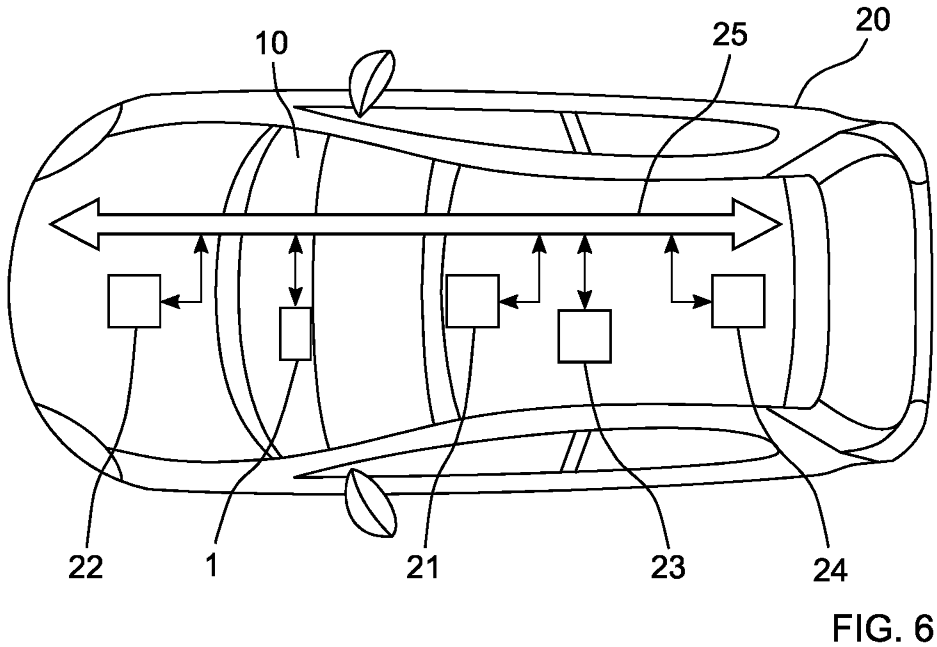
FIG. 6 schematically shows a transportation means that utilizes a display device according to the disclosure.

FIG. 6 schematically shows a transportation means 20 that utilizes a display device 1 according to the disclosure. The transportation means 20 is a motor vehicle in this example. The motor vehicle has a display device 1 according to the invention, which is disposed in a dashboard 10. Data on the vehicle surroundings can be acquired by a sensor system 21. The sensor system 21 may in particular comprise surroundings recognition sensors, for example ultrasound sensors, laser scanners, radar sensors, lidar sensors or cameras. The information acquired by the sensor system 21 can be used to generate content to be displayed for the display device 1. Further constituent parts of the motor vehicle in this example are a navigation system 22, by which positional information may be provided, and also a data transmission unit 23. A connection to a back-end, for example for receiving updated software for the components of the motor vehicle, may, for example, be established by means of the data transmission unit 23. A memory 24 is present for storing data. Data is exchanged between the various components of the motor vehicle via a network 25.

The invention claimed is:

1. A display device comprising:

a display module having a display panel; and a housing for receiving the display module;

wherein the housing includes a plurality of bistable elements, each of the bistable elements forming a respective resilient fastening element disposed on each side of two opposite sides of the housing, each of the plurality of resilient fastening elements being structured such that a force acting perpendicularly on the display panel causes a rotation of the housing of the display device about an axis perpendicular to the two opposite sides and causes the plurality of bistable elements to flexurally buckle from a first stable state to a second stable state; and wherein the two opposite sides each have two or more resilient fastening elements.

2. The display device as claimed in claim 1, wherein the resilient fastening elements form an integral constituent part of the housing.

3. The display device as claimed in claim 1, wherein the housing and the resilient fastening elements are made from a magnesium-based material.

4. The display device as claimed in claim 1, wherein the resilient fastening elements are bistable elements.

5. The display device as claimed in claim 1, wherein an arm length of the bistable elements is chosen such that a resultant elastic deformation path enables a jump from a first state to a second state.

6. The display device as claimed in claim 5, wherein the bistable elements when jumping from the first state to the second state are stressed beyond a yield point.

7. A dashboard for a motor vehicle comprising:

a display device, comprising:

a display module having a display panel; and a housing for receiving the display module;

wherein the housing includes a plurality of resilient fastening elements disposed on each side of two opposite sides of the housing, each of the plurality of resilient fastening elements being structured such that a force acting perpendicularly on the display panel causes a rotation of the housing of the display device about an axis perpendicular to the two opposite sides; and wherein the display device is fastened to assigned fastening points of the dashboard by the plurality of resilient fastening elements.

8. A motor vehicle comprising:

a dashboard, comprising:

a display device, comprising:

a display module having a display panel; and a housing for receiving the display module;

wherein the housing includes a plurality of resilient fastening elements disposed on each side of two opposite sides of the housing, the plurality of resilient fastening element being structured such that a force acting perpendicularly on the display panel causes a rotation of the housing of the display device about an axis perpendicular to the two opposite sides; and wherein the display device is fastened to assigned fastening points of the dashboard by the plurality of resilient fastening elements.

* * * * *